(12) United States Patent
Hirayama et al.

(10) Patent No.: US 8,470,959 B2
(45) Date of Patent: Jun. 25, 2013

(54) POLYIMIDE COMPOUND, PREPARATION METHOD THEREFOR, AND OPTICAL FILM AND OPTICAL WAVEGUIDE PRODUCED BY EMPLOYING THE COMPOUND

(75) Inventors: Tomoyuki Hirayama, Ibaraki (JP); Junichi Fujisawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 450 days.

(21) Appl. No.: 12/790,100

(22) Filed: May 28, 2010

(65) Prior Publication Data

US 2010/0322586 A1    Dec. 23, 2010

(30) Foreign Application Priority Data

Jun. 23, 2009  (JP) .................................. 2009-148469

(51) Int. Cl.
  *C08G 73/10*   (2006.01)
(52) U.S. Cl.
  USPC ........... 528/353; 385/142; 385/144; 528/310; 548/455
(58) Field of Classification Search
  USPC ........................... 385/142, 144; 528/310, 353
  See application file for complete search history.

(56) References Cited

U.S. PATENT DOCUMENTS

| | | | |
|---|---|---|---|
| 6,096,492 A | 8/2000 | Weber et al. | |
| 6,100,582 A | 8/2000 | Omote et al. | |
| 7,060,771 B2 | 6/2006 | Komoriya et al. | |
| 7,417,100 B2 | 8/2008 | Komoriya et al. | |
| 8,093,349 B2 * | 1/2012 | Ataka et al. | 528/353 |
| 2002/0037995 A1 | 3/2002 | Tsumiyama | |
| 2008/0090927 A1 | 4/2008 | Ishii et al. | |

FOREIGN PATENT DOCUMENTS

| | | | |
|---|---|---|---|
| CN | 1177272 A | 3/1998 | |
| CN | 101014643 A | 8/2007 | |
| JP | 6-308503 A | 11/1994 | |
| JP | 08-041323 A | 2/1996 | |
| JP | 2002-201231 A | 7/2002 | |
| JP | 2003-064182 A | 3/2003 | |
| JP | 2003-089779 A | 3/2003 | |
| JP | 2006-1968 A | 1/2006 | |
| JP | 2006-131662 A | 5/2006 | |
| JP | 3859984 B2 | 12/2006 | |
| JP | 2010-077184 A | 4/2010 | |
| WO | 03-073141 A1 | 9/2003 | |
| WO | WO 2004/006057 | * | 1/2004 |
| WO | WO 2008/013210 | * | 1/2008 |
| WO | 2008-041636 A1 | 10/2008 | |

OTHER PUBLICATIONS

Japanese Office Action dated Dec. 4, 2012, issued in corresponding Japanese patent application No. 2009-148469, w/ English translation.

Chinese Office Action dated Jul. 24, 2012, issued in corresponding Chinese Patent Application No. 201010211053.X (5 pages).

* cited by examiner

*Primary Examiner* — Gregory Listvoyb
(74) *Attorney, Agent, or Firm* — Westerman, Hattori, Daniels & Adrian, LLP

(57) ABSTRACT

A novel polyimide compound which has a low linear expansion coefficient and permits film formation by a spin coating method or the like, a preparation method for the polyimide compound, and an optical film and an optical waveguide produced by employing the compound. The polyimide compound has a structural unit represented by the following general formula (1):

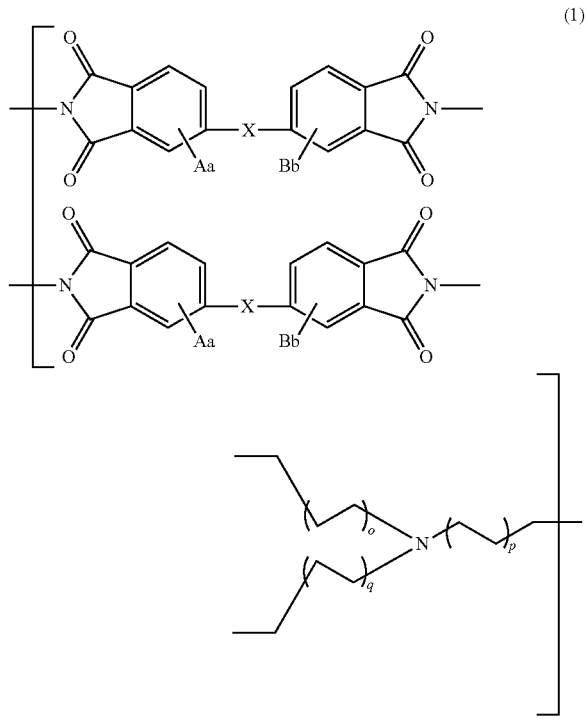

wherein X is a covalent single bond, —$CH_2$—, —$C(CF_3)_2$— or —CR(R')— (wherein R and R', which may be the same or different, are each a $C_1$ to $C_6$ alkyl group or an aryl group); A and B, which may be the same or different, are substituents each selected from a hydroxyl group, a halogen group and a $C_1$ to $C_4$ alkyl group; a and b, which are the numbers of the substituents A and B, respectively, are each an integer of 0 to 2; and o, p and q are each an integer of 1 to 5.

4 Claims, 1 Drawing Sheet

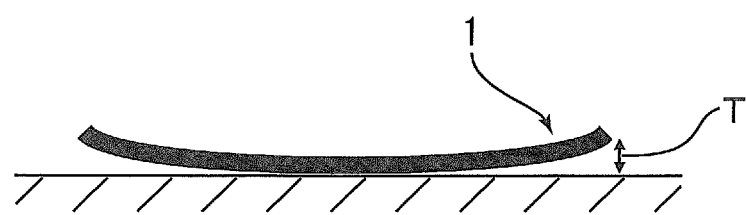

POLYIMIDE COMPOUND, PREPARATION METHOD THEREFOR, AND OPTICAL FILM AND OPTICAL WAVEGUIDE PRODUCED BY EMPLOYING THE COMPOUND

BACKGROUND OF THE INVENTION

1. Field of the Invention

The present invention relates to a polyimide compound, a preparation method therefor, and an optical film and an optical waveguide produced by employing the compound.

2. Description of the Related Art

Conventionally, plastic materials containing essentially a polyimide resin, an epoxy resin or an acrylate resin are often used in the field of optics. Such optical resins are generally required to have heat resistance, moisture resistance and other various properties depending upon their applications. To this end, various types of optical resins have been developed, which are imparted with various properties by modifying a main chain and a side chain of a polymeric skeletal structure. Particularly, highly transparent plastic materials for use as sealing materials for optical elements and for use as materials for flexible wiring boards are now under consideration for application to optical waveguides (see JP-A-2003-89779, JP-A-HEI8 (1996)-41323 and JP-A-2002-201231).

With the recent trend toward higher information capacity and higher information transmission speed, focus is directed to development of opto-electric hybrid boards. Such a board typically includes a metal substrate (including a substrate having a metal layer) and an optical waveguide provided on the substrate. Depending upon the type of the substrate to be used, the linear expansion coefficient of a resin material for the optical waveguide should be properly controlled. This is because the metal substrate has a low linear expansion coefficient while a conventional ordinary resin material for the optical waveguide has a higher linear expansion coefficient. Where a layer of the resin material is formed on the metal substrate, the resulting board is liable to be thermally warped (or curled) (due to heat applied during production thereof or ambient heat applied after the production thereof).

A conceivable approach to this problem is to introduce a crosslink structure into the resin material to reduce the linear expansion coefficient. The easiest method for providing the crosslink structure is, for example, to introduce a multifunctional group. However, this method suffers from gelation of a polymer, making it difficult to form a coating film by applying a resin composition (e.g., by a spin coating method or the like) for the formation of the optical waveguide or the like.

In view of the foregoing, it is an object of the present invention to provide a novel polyimide compound which has a low linear expansion coefficient and permits film formation by the spin coating method or the like, a preparation method for the compound, and an optical film and an optical waveguide produced by employing the compound.

SUMMARY OF THE INVENTION

According to a first aspect of the present invention to achieve the aforementioned object, there is provided a polyimide compound having a structural unit represented by the following general formula (1):

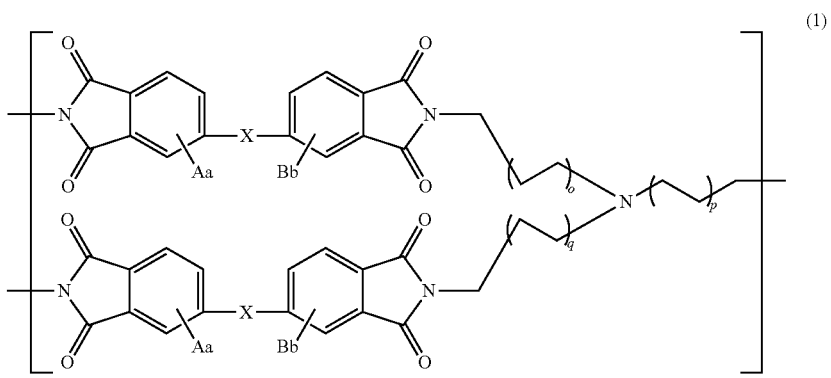

wherein X is a covalent single bond, $-CH_2-$, $-C(CF_3)_2-$ or $-CR(R')-$ (wherein R and R', which may be the same or different, are each a $C_1$ to $C_6$ alkyl group or an aryl group); A and B, which may be the same or different, are substituents each selected from a hydroxyl group, a halogen group and a $C_1$ to $C_4$ alkyl group; a and b, which are the numbers of the substituents A and B, respectively, are each 0 or an integer of 1 or 2; and o, p and q are each an integer of 1 to 5.

According to a second aspect of the present invention, there is provided a preparation method for the aforementioned polyimide compound, the method comprising the steps of: causing a tetracarboxylic dianhydride represented by the following general formula (2) and a trifunctional alkylamine represented by the following general formula (3) to react with each other to introduce the trifunctional alkylamine in a proportion of less than 10 mol % based on the amount of the tetracarboxylic dianhydride into the tetracarboxylic dianhydride and polymerize the trifunctional alkylamine and the tetracarboxylic dianhydride to prepare a polyamic acid in a liquid form; and imidizing the polyamic acid in the liquid form.

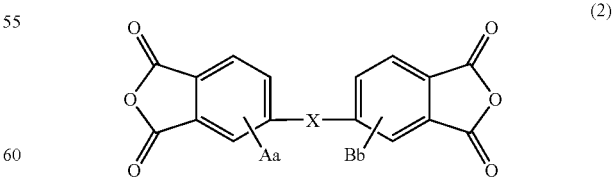

wherein X is a covalent single bond, $-CH_2-$, $-C(CF_3)_2-$ or $-CR(R')-$ (wherein R and R', which may be the same or different, are each a $C_1$ to $C_6$ alkyl group or an aryl group); A and B, which may be the same or different, are substituents each selected from a hydroxyl group, a halogen group and a $C_1$ to $C_4$ alkyl group; and a and b, which are the numbers of the substituents A and B, respectively, are each 0 or an integer of 1 or 2.

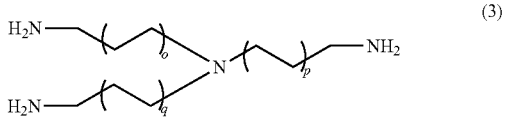

(3)

wherein o, p and q are each an integer of 1 to 5.

According to a third aspect of the present invention, there is provided an optical film composed of a resin comprising the aforementioned polyimide compound as a matrix polymer.

According to a fourth aspect of the present invention, there is provided an optical waveguide comprising a substrate, a cladding layer provided on the substrate, and a core provided in a predetermined pattern in the cladding layer for transmission of an optical signal, at least one of the cladding layer and the core being composed of a resin comprising the aforementioned polyimide compound as a matrix polymer.

The inventors of the present invention conducted a series of studies to solve the aforementioned problems, and conducted experiments by synthesizing various compounds each having a specific structure. As a result, the inventors found that the object described above is achieved by using the novel polyimide compound having the structural unit represented by the above general formula (1), and attained the present invention. As indicated by the above general formula (1), the novel polyimide compound has a specific crosslink structure introduced into a polyimide skeleton by copolymerization with the trifunctional alkylamine. This reduces the linear expansion coefficient of the polyimide compound.

Further, the inventors found that the novel polyimide compound can be prepared by imidizing the polyamic acid (polyimide precursor) synthesized by polymerizing the tetracarboxylic dianhydride represented by the above general formula (2) and the trifunctional alkylamine represented by the above general formula (3) in a specific ratio (with the trifunctional alkylamine being present in a proportion of less than 10 mol % based on the amount of the tetracarboxylic dianhydride). The polyamic acid synthesized through the reaction between the tetracarboxylic dianhydride and the trifunctional alkylamine blended in the specific ratio is provided in the liquid form, so that the film formation can be achieved by a spin coating method or the like. In general, if the synthesis of the polyamic acid is achieved by introduction of a small amount of a polyfunctional amine, gelation is liable to occur due to the crosslink structure of the polyamic acid. In the present invention, however, it is possible to synthesize the polyamic acid in the liquid form without the possibility of the gelation. This is supposedly because the trifunctional amine having a crosslink site is blended in a proportion of less than 10 mol % based on the amount of the tetracarboxylic dianhydride, and is an alkylamine capable of flexibilizing the polyamic acid.

As described above, the inventive polyimide compound is a specific polyimide compound having the structural unit represented by the above general formula (1). This compound has a low linear expansion coefficient because of its specific skeletal structure. Therefore, where a layer of a resin comprising the polyimide compound as a matrix polymer is formed on a metal substrate having a low linear expansion coefficient, for example, the resulting board is substantially free from thermal warpage which may otherwise occur due to heat (heat applied during production thereof or ambient heat applied after the production). Therefore, the inventive polyimide compound is useful as a material for an optical waveguide including a metal substrate. The inventive polyimide compound is highly transparent and, therefore, useful as an optical material for an optical film, a liquid crystal display substrate, a micro lens and the like. Further, the inventive polyimide compound is excellent in heat resistance and alkali developability and, therefore, useful as a solder resist material for a flexible circuit board to be mounted with an electronic component such as a semiconductor element by soldering. The polyamic acid, which is a precursor of the inventive polyimide compound, is provided in the liquid form and, therefore, permits film formation by a spin coating method or the like.

The inventive polyimide compound having the aforementioned specific skeletal structure as the structural unit can be synthesized by causing the specific tetracarboxylic dianhydride and the specific trifunctional alkylamine to react with each other to prepare the polyamic acid (polyimide precursor) in the liquid form, and imidizing the polyamic acid.

The optical film composed of the resin comprising the polyimide compound as the matrix polymer, even if having a smaller thickness, is less liable to suffer from thermal warpage and distortion which may otherwise occur due to heat (heat applied during production thereof or ambient heat applied after the production), because the polyimide compound has a low linear expansion coefficient.

Like the aforementioned optical film, the optical waveguide produced by employing the resin comprising the polyimide compound as the matrix polymer is less liable to suffer from thermal warpage and distortion. The thermal warpage and distortion of the optical waveguide including the metal substrate having a low linear expansion coefficient can be significantly suppressed as compared with the conventional optical waveguide produced by employing the ordinary optical waveguide resin material.

BRIEF DESCRIPTION OF THE DRAWING

FIG. 1 is a diagram for explaining a curl test conducted in Examples.

DETAILED DESCRIPTION OF THE INVENTION

The present invention will hereinafter be described by way of embodiments thereof.

A polyimide compound according to the present invention is a compound having a structural unit represented by the following general formula (1). In the following general formula (1), X is a single bond (covalent single bond), —$CH_2$—, —$C(CF_3)_2$— or —CR(R')—, among which —$C(CF_3)_2$— is preferred for solubility and transparency. In the group —CR(R')—, R and R', which may be the same or different, are each a $C_1$ to $C_6$ alkyl group or an aryl group. Examples of the aryl group include a phenyl group, a benzyl group and a tolyl group. In the following general formula (1), A and B, which may be the same or different, are substituents each selected from a hydroxyl group, a halogen group and a $C_1$ to $C_4$ alkyl group, and a and b, which are the numbers of the substituents A and B, respectively, are each 0 or an integer of 1 or 2. Thus, the polyimide compound can be optionally substituted with the specific substituents A and B. Further, o, p and q are numbers which determine the numbers of carbons of alkyl groups of a trifunctional alkylamine (represented by the general formula (3) to be described later) as an ingredient of the polyimide compound, and are each an integer of 1 to 5.

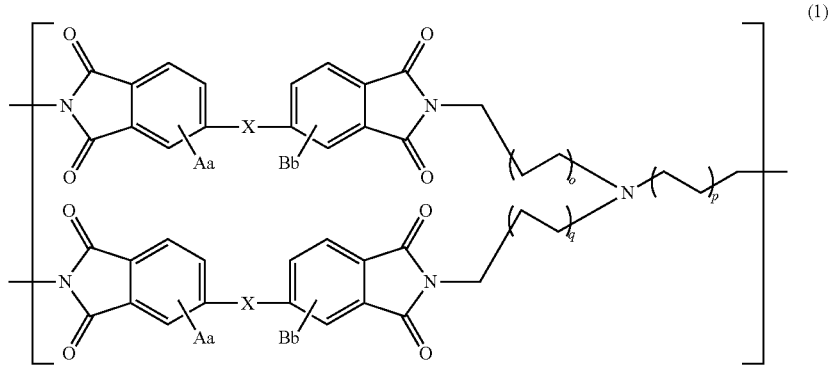

(1)

The proportion of the structural unit represented by the above general formula (1) is not less than 3 to less than 10 mol %, for reduction of the viscosity of the polyamic acid (polyimide precursor) or suppression of the gelation and for reduction of the linear expansion coefficient.

The inventive polyimide compound, which has the specific skeletal structure represented by the general formula (1), has a low linear expansion coefficient. More specifically, the inventive polyimide compound has a linear expansion coefficient of not higher than 40 ppm/° C., preferably 20 to 30 ppm/° C. The linear expansion coefficient is measured, for example, by means of a thermomechanical analyzer (TMA).

The inventive polyimide compound preferably has a weight average molecular weight (Mw) of 10000 to 100000, more preferably 50000 to 80000. If the weight average molecular weight is less than 10000, the polyimide compound tends to be poorer in physical properties such as heat resistance (e.g., heat resistance during a solder reflow process). If the weight average molecular weight is greater than 100000, the polyimide compound tends to be poorer in alkali developability. The weight average molecular weight is measured by gel permeation chromatography (GPC) based on polystyrene calibration standards.

The inventive polyimide compound having the structural unit represented by the above general formula (1) can be produced by causing a tetracarboxylic dianhydride represented by the following general formula (2) and a trifunctional alkylamine represented by the following general formula (3) to react with each other to introduce the trifunctional alkylamine in a proportion of less than 10 mol % based on the amount of the tetracarboxylic dianhydride into the tetracarboxylic dianhydride and polymerize the trifunctional alkylamine and the tetracarboxylic dianhydride to prepare a polyamic acid (polyimide precursor) in a liquid form, and then imidizing the polyamic acid in the liquid form. If the proportion of the trifunctional alkylamine to be introduced is not less than 10 mol %, the gelation will occur. The proportion of the trifunctional alkylamine to be introduced is preferably not less than 1 mol % and less than 10 mol % based on the amount of the tetracarboxylic dianhydride for proper polymerization. If the proportion of the trifunctional alkylamine is less than 1 mol %, it will be impossible to provide a sufficient crosslinking effect.

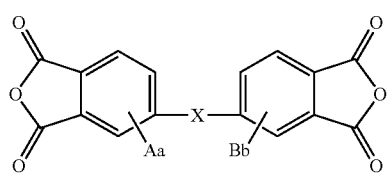

(2)

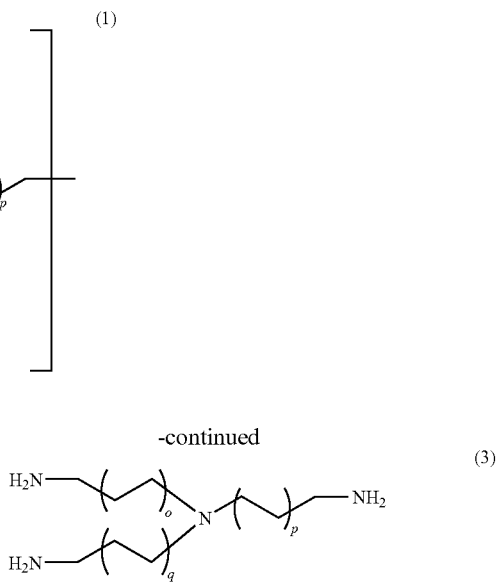

(3)

Examples of the tetracarboxylic dianhydride represented by the above general formula (2) include 4,4'-(hexafluoroisopropylidene)diphthalic dianhydride, 3,3',4,4'-benzophenonetetracarboxylic dianhydride, 4,4'-oxydiphthalic dianhydride, 3,3',4,4'-diphenylsulfonetetracarboxylic dianhydride, 4,4'-biphthalic dianhydride, pyromellitic dianhydride, and bicycle[2,2,2]oct-7-ene-2,3,5,6-tetracarboxylic dianhydride, which may be used either alone or in combination.

Examples of the trifunctional alkylamine represented by the above general formula (3) include tris(3-aminopropyl) amine and tris(2-aminoethyl)amine, which may be used either alone or in combination.

The polyamic acid (polyamide precursor) is prepared by causing the tetracarboxylic dianhydride represented by the above general formula (2) and the trifunctional alkylamine represented by the above general formula (3) to react with each other. The reaction temperature is preferably 20° C. to 80° C., particularly preferably 20° C. to 40° C.

In the present invention, a difunctional amine may be optionally added to the ingredients of the polyamic acid in a proportion so as not to cause the gelation of the polyamic acid (in a proportion such as to maintain the polyamic acid in the liquid form) during the synthesis of the polyamic acid. Examples of the difunctional amine include 2,2-bis(3-amino-4-hydroxyphenyl)hexafluoropropane, 3,3'-dihydroxybenzidine, 9,9-bis(4-aminophenyl)fluorene, 9,9-bis(4-amino-3-methylphenyl)fluorene, 9,9-bis(3-amino-4-hydroxyphenyl) fluorene, 9,9-bis(4-amino-3-fluorophenyl)fluorene, o-tolidine and 3,3',5,5'-tetramethylbenzidine, which may be used either alone or in combination. Where the inventive polyimide compound is used for a solder resist material or an optical waveguide, an amine containing a phenolic OH group at its main chain skeleton, e.g., 2,2-bis(3-amino-4-hydroxyphenyl)hexafluoropropane, is preferably used in order to ensure proper patternability without impairment of the alkali developability.

Where the difunctional amine is blended, the proportion of the difunctional amine is preferably not less than 90 mol % based on the amount of the tetracarboxylic dianhydride in order to maintain the polyamic acid in the liquid form.

A reaction solvent is typically used for the preparation of the polyamic acid. Preferred examples of the reaction solvent include aromatic hydrocarbons (such as toluene and xylene), ethers (such as tetrahydrofuran and dibutyl ether) and aprotic polar solvents (such as N-methylpyrrolidone, N-methyl-2-pyrrolidone, N,N-dimethylformamide and N,N-dimethylacetamide), which may be used either alone or in combination.

The imidization of the polyamic acid thus prepared is achieved by thermal imidization or the like. More specifically, the imidization temperature is preferably 150° C. to 400° C., particularly preferably 200° C. to 300° C.

The inventive polyimide compound thus prepared is highly transparent and, therefore, useful as an optical material for an optical waveguide, an optical film, a liquid crystal display substrate or a micro lens, or a sealing material for an optical element. Further, the inventive polyimide compound is excellent in heat resistance and alkali developability and, therefore, useful as a solder resist material for a flexible circuit board to be mounted with an electronic component such as a semiconductor element by soldering. Since the polyamic acid serving as the precursor of the inventive polyimide compound is provided in the liquid form, it is possible to form a film of the inventive polyimide compound by a coating method. Examples of the coating method include those employing a spin coater, a coater, a disk coater and a bar coater, a roll-to-roll continuous coating method employing a coating machine such as a multi-coater, a screen printing method and an electrostatic coating method.

An optical film composed of a resin containing the polyimide compound as a matrix polymer, even if having a smaller thickness, is less liable to suffer from thermal warpage and distortion which may otherwise occur due to heat (heat applied during production thereof or ambient heat applied after the production), because the polyimide compound has a low linear expansion coefficient.

Like the optical film, an optical waveguide produced by employing a resin containing the polyimide compound as a matrix polymer is less liable to suffer from thermal warpage and distortion. Particularly, the thermal warpage and distortion of an optical waveguide including a metal substrate having a low linear expansion coefficient can be significantly suppressed as compared with the conventional optical waveguide produced by employing the ordinary optical waveguide resin material.

The expression "a resin containing the polyimide compound as a matrix polymer" herein means not only a resin containing the polyimide compound alone but also a resin optionally containing a tackifier, a flexibilizer, an antioxidant, a defoaming agent and the like in addition to the polyimide compound as the resin material. These additives are each blended in a proportion so as not to impair the effects of the present invention.

The inventive optical waveguide includes a substrate, a cladding layer provided on the substrate, and a core provided in a predetermined pattern in the cladding layer for transmission of an optical signal. In the inventive optical waveguide, at least one of the cladding layer and the core is composed of a resin containing the polyimide compound as a matrix polymer.

A material for the substrate is not limited to a metal, but a polymer film or a glass substrate may be used. Specific examples of the polymer film include polyethylene terephthalate (PET) films, polyethylene naphthalate films and polyimide films. The substrate typically has a thickness of 10 μm to 3 mm.

Examples of the optical waveguide include a linear optical waveguide, a curved optical waveguide, a cross optical waveguide, a Y-branched optical waveguide, a slab optical waveguide, a Mach-Zehnder optical waveguide, an AWG type optical waveguide, a grating and an optical waveguide lens. Examples of optical devices employing such optical waveguides include a wavelength filter, an optical switch, an optical divider, an optical multiplexer, an optical multiplexer/demultiplexer, an optical amplifier, a wavelength converter, a wavelength divider, an optical splitter, a directional coupler and a light transmission module provided by hybrid integration of a laser diode and a photodiode.

Next, inventive examples will be described in conjunction with comparative examples. It should be understood that the present invention is not limited to the inventive examples.

EXAMPLE 1

Synthesis of Polyamic Acid Solution

First, 3.41 g of 2,2-bis(3-amino-4-hydroxyphenyl) hexafluoropropane and 135.5 mg of tris(3-aminopropyl) amine were blended in a reaction vessel provided with a stirrer, and dissolved in 20.2 ml of dry N,N-dimethylacetamide. Then, 4.60 g of 4,4'-(hexafluoroisopropylidene)diphthalic dianhydride was slowly added to the resulting solution with stirring, and the resulting mixture was further stirred at 40° C. for 5 hours. Thus, an N,N-dimethylacetamide solution of a polyamic acid (polyimide precursor) was prepared (which had a solid concentration of 30%, an overall weight of 27.0 g and a trifunctional amine proportion of 7 mol %).

Production of Polyimide Film

The solution of the polyamic acid thus prepared was applied onto a glass substrate by a spin coating method. The resulting coating film was pre-baked for 15 minutes on a hot plate heated at 90° C., and then further heated at 300° C. at a reduced pressure for 2 hours, whereby the polyamic acid was imidized into a polyimide. The resulting film was peeled off from the glass substrate to provide a polyimide film (having a thickness of 4.8 μm).

EXAMPLE 2

First, 3.48 g of 2,2-bis(3-amino-4-hydroxyphenyl) hexafluoropropane and 95 mg of tris(3-aminopropyl)amine were blended in a reaction vessel provided with a stirrer, and dissolved in 20.2 ml of dry N,N-dimethylacetamide. Then, 4.55 g of 4,4'-(hexafluoroisopropylidene)diphthalic dianhydride was slowly added to the resulting solution with stirring, and the resulting mixture was further stirred at 40° C. for 5 hours. Thus, an N,N-dimethylacetamide solution of a polyamic acid (polyimide precursor) was prepared (which had a solid concentration of 30%, an overall weight of 27.0 g and a trifunctional amine proportion of 5 mol %).

With the use of the solution of the polyamic acid thus prepared, a polyimide film (having a thickness of 5.6 μm) was produced in substantially the same manner as in Example 1.

EXAMPLE 3

First, 3.55 g of 2,2-bis(3-amino-4-hydroxyphenyl) hexafluoropropane and 55.6 mg of tris(3-aminopropyl) amine were blended in a reaction vessel provided with a stirrer, and dissolved in 20.2 ml of dry N,N-dimethylacetamide. Then, 4.51 g of 4,4'-(hexafluoroisopropylidene)diphthalic dianhydride was slowly added to the resulting solution with stirring, and the resulting mixture was further stirred at 40° C. for 5 hours. Thus, an N,N-dimethylacetamide solution of a polyamic acid (polyimide precursor) was prepared (which had a solid concentration of 30%, an overall weight of 26.5 g and a trifunctional amine proportion of 3 mol %).

With the use of the solution of the polyamic acid thus prepared, a polyimide film (having a thickness of 5.0 μm) was produced in substantially the same manner as in Example 1.

COMPARATIVE EXAMPLE 1

First, 3.30 g of 2,2-bis(3-amino-4-hydroxyphenyl)hexafluoropropane and 188.3 mg of tris(3-aminopropyl)amine were blended in a reaction vessel provided with a stirrer, and dissolved in 20.2 ml of dry N,N-dimethylacetamide. Then, 4.67 g of 4,4'-(hexafluoroisopropylidene)diphthalic dianhydride was slowly added to the resulting solution with stirring, and the resulting mixture was further stirred at 40° C. At this time, the resulting polyamic acid was immediately gelatinized.

Therefore, it was impossible to produce a polyimide film in the same manner as in Example 1. Alternatively, the polyimide film was produced by physically rolling the resulting gel and heating the resulting gel film (having a trifunctional amine proportion of 10 mol %) at 300° C. for 2 hours.

COMPARATIVE EXAMPLE 2

First, 4.12 g of 2,2-bis(3-amino-4-hydroxyphenyl)hexafluoropropane was dissolved in 22.6 ml of dry N,N-dimethylacetamide in a reaction vessel provided with a stirrer. Then, 4.51 g of 4,4'-(hexafluoroisopropylidene)diphthalic dianhydride was slowly added to the resulting solution with stirring, and the resulting mixture was further stirred at 40° C. for 5 hours. Thus, an N,N-dimethylacetamide solution of a polyamic acid (polyimide precursor) was prepared (which had a solid concentration of 30%, an overall weight of 30.2 g and a trifunctional amine proportion of 0 mol %).

With the use of the solution of the polyamic acid thus prepared, a polyimide film (having a thickness of 5.5 μm) was produced in substantially the same manner as in Example 1.

COMPARATIVE EXAMPLE 3

First, 3.76 g of 2,2-bis(3-aminophenyl)hexafluoropropane was dissolved in 22.6 ml of dry N,N-dimethylacetamide in a reaction vessel provided with a stirrer. Then, 5.00 g of 4,4'-(hexafluoroisopropylidene)diphthalic dianhydride was slowly added to the resulting solution with stirring, and the resulting mixture was further stirred at 40° C. for 5 hours. Thus, an N,N-dimethylacetamide solution of a polyamic acid (polyimide precursor) was prepared (which had a solid concentration of 30%, an overall weight of 26.5 g and a trifunctional amine proportion of 0 mol %).

With the use of the solution of the polyamic acid thus prepared, a polyimide film was produced in substantially the same manner as in Example 1.

The polyimide compounds for the polyimide films of Examples and Comparative Examples thus produced each had a structure represented by the following general formula (4), and the molar ratio of structural units (m+m'/n), substituents $R_1$ to $R_6$ and the lengths of alkyl chains (o, p, q) are shown in Table 1. "Alkyl chain length (o,p,q)=1" in Table 1 means "o=p=q=1".

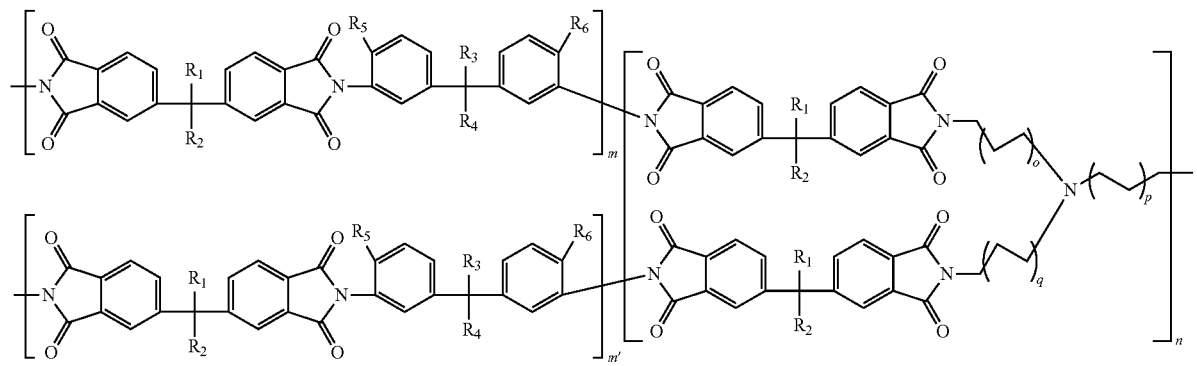

(4)

The linear expansion coefficient (ppm/° C.), the transmittance (%) and the weight average molecular weight (Mw) of each of the polyimides for the polyimide films were measured by using the polyimide films as samples. The linear expansion coefficient was measured by means of a thermomechanical analyzer (TMA). The transmittance was measured in a visible-to-ultraviolet (UV) spectral range. The weight average molecular weight was measured by the gel permeation chromatography (GPC). The results are also shown in Table 1. Comparative Example 1 was not evaluated for these properties.

The polyamic acid solutions of Examples and Comparative Examples were evaluated for the following properties based on the following criteria. As described above, Comparative Example 1 suffered from the gelation, but no particular problem was observed in Examples 1 to 3 and Comparative Examples 2 and 3. For the evaluation of the coatability, therefore, Comparative Example 1 was rated as unacceptable (X), and Examples 1 to 3 and Comparative Examples 2 and 3 were rated as acceptable (○). Comparative Example 1 was not evaluated for properties other than the coatability.

Reflow Resistance

A reflow resistance test (a decomposition resistance test at not lower than 270° C.) was performed by means of a thermomechanical analyzer (TMA). A test sample having experienced a less than 3% weight reduction was rated as acceptable (○).

Curl Resistance

The polyamic acid solutions were each applied onto one surface of a flat SUS substrate (SUS304H-TA available from Nippon Steel Corporation) having a size of 7 cm×7 cm×0.025 mm (thickness), and the resulting coating films were heated at 80° C. for 10 minutes, then at 150° C. for 30 minutes and further at 350° C. for 2 hours. Thus, samples were prepared, which each included a 20-μm thick polyimide layer formed on the SUS substrate. The warpage (curl) of each of the samples thus prepared was measured and evaluated in the following manner. As shown in FIG. 1, a sample 1 was placed on a flat area, and the height T of an edge of the sample 1 was measured. A sample having a height T of not greater than 0.5 cm was rated as acceptable.

TABLE 1

|  |  | Example | | | Comparative Example | | |
| --- | --- | --- | --- | --- | --- | --- | --- |
|  |  | 1 | 2 | 3 | 1 | 2 | 3 |
| Molar ratio (m + m'/n) | | 93/7 | 95/5 | 97/3 | 90/10 | 100/0 | 100/0 |
| Substituents | $R_1, R_2$ | $CF_3$ | $CF_3$ | $CF_3$ | $CF_3$ | $CF_3$ | $CF_3$ |
|  | $R_3, R_4$ | $CF_3$ | $CF_3$ | $CF_3$ | $CF_3$ | $CF_3$ | $CF_3$ |
|  | $R_5, R_6$ | OH | OH | OH | OH | OH | OH |
| Alkyl chain length (o, p, q) | | 1 | 1 | 1 | 1 | — | — |
| Linear expansion coefficient (ppm/° C.) | | 36 | 38 | 40 | — | 43 | 42 |
| Transmittance (%) | | >92% | >92% | >92% | — | >92% | >92% |
| Weight average molecular weight (Mw) | | 65000 | 72000 | 59000 | — | 53000 | 85000 |
| Coatability | | ○ | ○ | ○ | X | ○ | ○ |
| Reflow resistance | | ○ | ○ | ○ | — | ○ | ○ |
| Curl height (cm) | | 0.4 | 0.6 | 0.9 | — | 1.1 | 1.2 |

As described above, the polyamic acids of Examples 1 to 3 were each prepared in a solution form and, therefore, were excellent in coatability. The polyimide compounds of Examples 1 to 3 prepared by imidizing the polyamic acids were excellent in reflow resistance. Further, the warpage of each of the samples of Examples 1 to 3 was suppressed in the curl test to meet the criteria specified in the present invention.

On the other hand, the polyamic acid of Comparative Example 1 was gelatinized during preparation thereof, leading to poorer coatability. The samples of Comparative Examples 2 and 3 each had a higher linear expansion coefficient and, therefore, suffered from significant warpage in the curl test, failing to meet the criteria specified in the present invention.

The films prepared in Examples 1 to 3 were highly transparent and, as shown in Table 1, each had a low linear expansion coefficient. Even if having a smaller thickness, these films were less liable to be thermally warped or distorted. Thus, it was confirmed that the films of Examples 1 to 3 each had excellent properties as optical films.

Like the films described above, optical waveguides produced by employing the polyimide compounds of Examples 1 to 3 were less liable to be thermally warped or distorted. Particularly, the results of the curl test indicated that the optical waveguides, even if being produced by employing a metal substrate having a low linear expansion coefficient, were free from the problem associated with the warpage.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. A polyimide compound consisting of a tetracarboxylic dianhydride, a trifunctional alkylamine and a bifunctional amine, the polyimide compound having a structural unit represented by the following general formula (1):

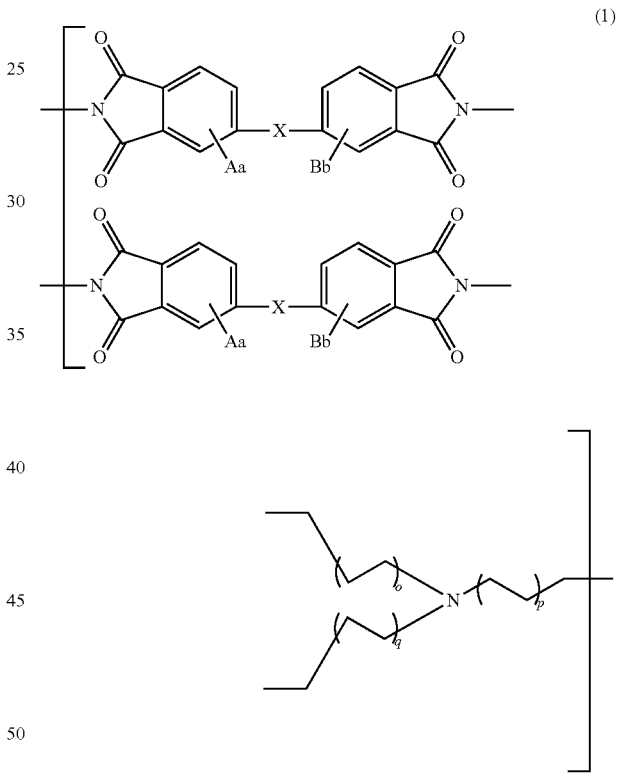

wherein X is a covalent single bond, $-CH_2-$, $-C(CF_3)_2-$ or $-CR(R')-$ (wherein R and R', which may be the same or different, are each a $C_1$ to $C_6$ alkyl group or an aryl group); A and B, which may be the same or different, are substituents each selected from a hydroxyl group, a halogen group and a $C_1$ to $C_4$ alkyl group; a and b, which are the numbers of the substituents A and B, respectively, are each 0 or an integer of 1 or 2; and o, p and q are each an integer of 1 to 5, wherein the structural unit is present in a proportion ranging from not less than 3 mol % and less than 10 mol %.

2. A preparation method for the polyimide compound having a structural unit represented by the following general formula (1):

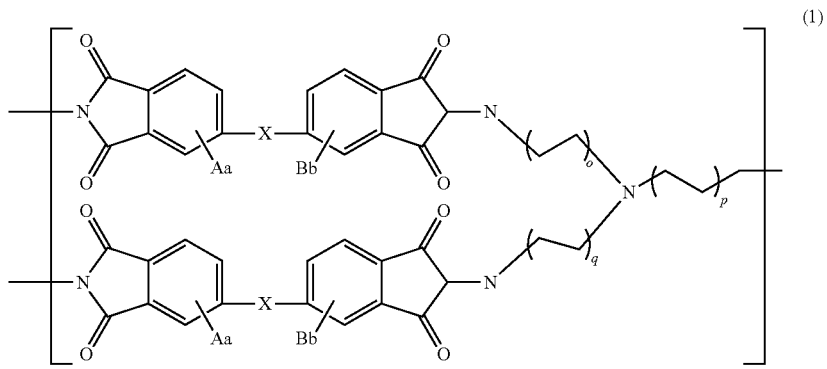

wherein X is a covalent single bond, —CH$_2$—, —C(CF$_3$)$_2$— or —CR(R')— (wherein R and R', which may be the same or different, are each a C1 to C6 alkyl group or an aryl group); A and B, which may be the same or different, are substituents each selected from a hydroxyl group, a halogen group and a C$_1$ to C$_4$ alkyl group; a and b, which are the numbers of the substituents A and B, respectively, are each 0 or an integer of 1 or 2; and o, p and q are each an integer of 1 to 5, comprising the steps of:

causing a tetracarboxylic dianhydride represented by the following general formula (2) and a trifunctional alkylamine represented by the following general formula (3) to react with each other to introduce the trifunctional alkylamine in a proportion of less than 10 mol % based on an amount of the tetracarboxylic dianhydride into the tetracarboxylic dianhydride and polymerize the trifunctional alkylamine and the tetracarboxylic dianhydride to prepare a polyamic acid in a liquid form; and imidizing the polyamic acid in liquid form,

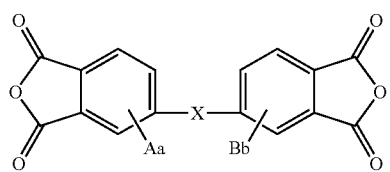

wherein X is a covalent single bond, —CH$_2$—, —C(CF$_3$)$_2$— or —CR(R')— (wherein R and R', which may be the same or different, are each a C$_1$ to C$_6$ alkyl group or an aryl group); A and B, which may be the same or different, are substituents each selected from a hydroxyl group, a halogen group and a C$_1$ to C$_4$ alkyl group; and a and b, which are the numbers of the substituents A and B, respectively, are each 0 or an integer of 1 or 2,

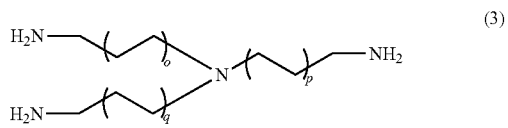

wherein o, p and q are each an integer of 1 to 5.

3. An optical film composed of a resin comprising the polyimide compound according to claim 1 as a matrix polymer.

4. An optical waveguide comprising:
  a substrate;
  a cladding layer provided on the substrate; and
  a core provided in a predetermined pattern in the cladding layer for transmission of an optical signal;
  wherein at least one of the cladding layer and the core is composed of a resin comprising the polyimide compound according to claim 1 as a matrix polymer.

\* \* \* \* \*